United States Patent [19]
Potter

[11] 3,717,212
[45] Feb. 20, 1973

[54] STEER CONTROL FOR HYDROSTATIC SYSTEM
[75] Inventor: Carl Richard Potter, Indianapolis, Ind.
[73] Assignee: General Motors Corporation, Detroit, Mich.
[22] Filed: Sept. 20, 1971
[21] Appl. No.: 181,884

Related U.S. Application Data
[63] Continuation-in-part of Ser. No. 869,316, Oct. 24, 1969, abandoned.

[52] U.S. Cl. ................................. 180/6.44, 60/53 A
[51] Int. Cl. .............................................. B62d 11/18
[58] Field of Search ............ 180/6.2, 6.44, 6.66, 6.7; 60/53 R, 53 A; 74/720.5, 687

[56] References Cited

UNITED STATES PATENTS

| | | | |
|---|---|---|---|
| 2,961,057 | 11/1960 | Johnson | 180/6.2 |
| 3,357,509 | 12/1967 | Gustafsson et al. | 180/6.44 |
| 3,425,296 | 2/1969 | Livezey | 74/720.5 |
| 3,495,405 | 2/1970 | Marlow | 60/52 R X |

FOREIGN PATENTS OR APPLICATIONS

| | | | |
|---|---|---|---|
| 1,954,438 | 7/1971 | Germany | 180/6.7 |

*Primary Examiner*—Leo Friaglia
*Assistant Examiner*—Leslie J. Paperner
*Attorney*—W. E. Finken et al.

[57] ABSTRACT

A servo control system for use with a steer by driving vehicle in which the steer propulsion is generated by a hydrostatic drive which provides steer bias to the propulsion. A pair of operator controlled servo mechanisms control the displacement of the pump for the hydrostatic drive. One of the servos is effective during forward driving and the other is effective during reverse driving thus permitting the operator to move the steer control lever in one direction for right turn and another direction for left turn. A spool valve controls the distribution of the control fluid to the pump displacement control motors from the servo mechanisms.

4 Claims, 2 Drawing Figures

INVENTOR.
Carl Richard Potter
BY
Donald H. Seherer
ATTORNEY

STEER CONTROL FOR HYDROSTATIC SYSTEM

This is a continuation-in-part of Ser. No. 869,316, filed Oct. 24, 1969, now abandoned.

In steer by driving vehicles, a steer maneuver is accomplished by creating a speed differential between the driving tracks of the vehicle. To create a speed differential, a hydrostatic drive system can be added in parallel to the propulsion system in such a manner that when the hydrostatic motor is driven an equal and opposite speed component is delivered to the two outputs of the propulsion system. If the hydrostatic motor is driven in the same direction during both forward and reverse driving, an opposite steer maneuver will occur. This can cause some confusion to an inexperienced operator. It is therefore desirable to permit the operator to manipulate the steer control in one direction for a right turn and the other direction for a left turn regardless of the propulsion direction of the vehicle. To provide a steer control which simplifies the operation of the vehicle, the present invention uses two servo mechanisms for controlling the displacement of the hydrostatic pump. The two servos are connected through a linkage such that the servo inputs are rotated in opposite directions. A spool valve controls the fluid delivery of the servo system in such a manner that during forward driving one servo is controlling and during reverse driving the other servo is controlling.

It is therefore an object of this invention to provide an improved servo control system for controlling the hydrostatic driven differential steer of a steer by driving transmission to provide the steer direction requested by the operator during both forward and reverse propulsion.

Another object of this invention is to provide in an improved steer control system one servo mechanism for controlling steer during forward driving and another servo mechanism for controlling steer during reverse driving.

These and other objects and advantages of the present invention will be more apparent to those skilled in the art from the following description and drawings in which.

Figures 1, 2:
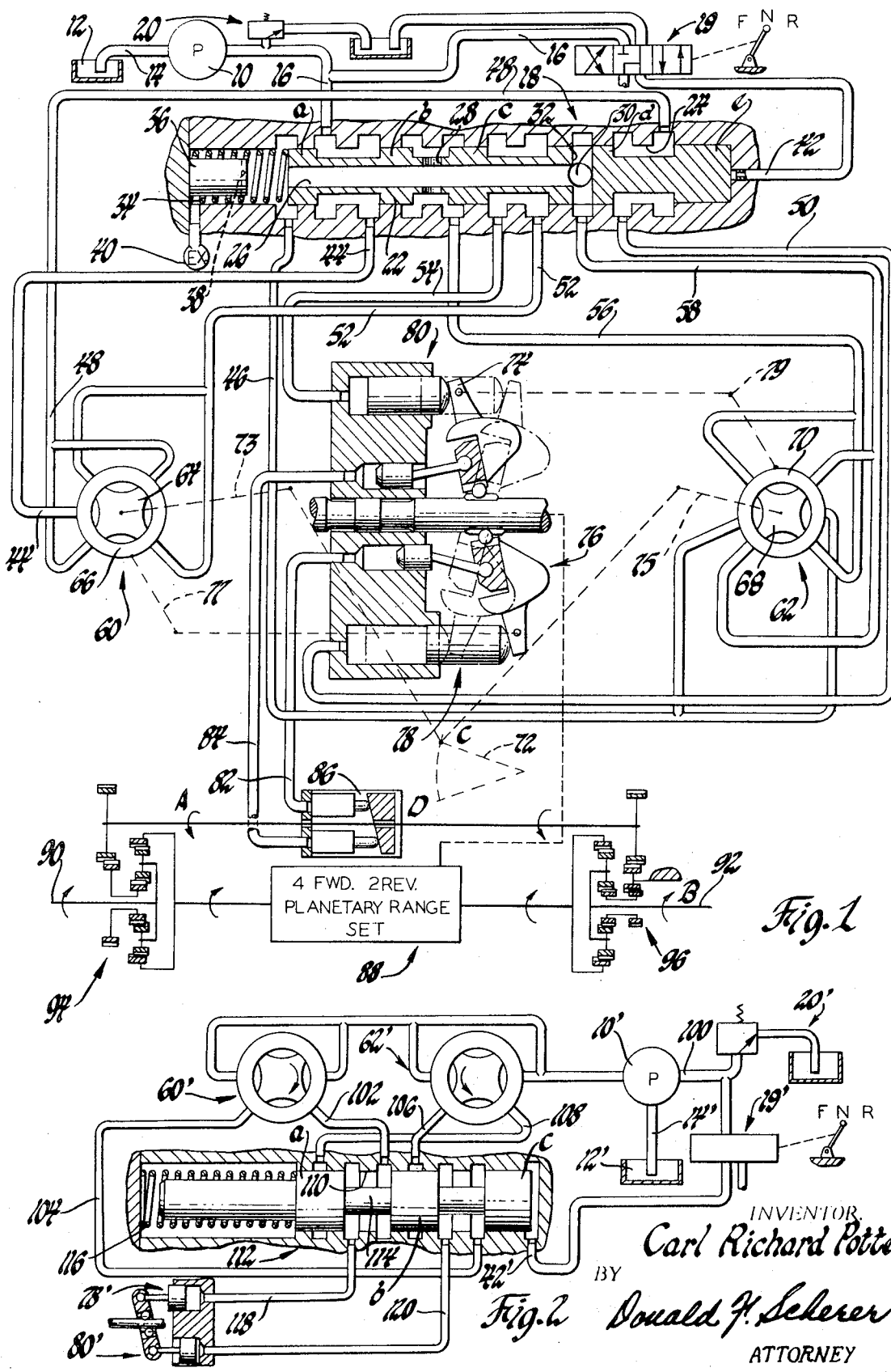
FIG. 1 is a diagrammatic view of the control system.
FIG. 2 is a diagrammatic view of a modification of the control system.

Referring to the drawings there is shown in FIG. 1 a control system having a pump 10 which draws fluid from a reservoir 12 through an inlet passage 14 and delivers the fluid through a main pressure passage 16 to a forward-reverse signal valve 18 and a manual control valve 19. The fluid pressure in main passage 16 is controlled by a conventional pressure regulator valve 20.

The manual control valve 19 is a conventional directional valve which is movable to neutral (N), forward (F) and reverse (R) positions in the reverse position, the manual control valve 19 supplies fluid pressure from passage 16 to a reverse signal passage 42.

The forward reverse valve 18 has a valve spool 22 having spaced equal diameter lands $a$, $b$, $c$, $d$ and $e$ slidably disposed in a valve bore 24. The valve spool 22 has a central passage 26 open at the left end of the valve spool 22, a cross passage 28 intersecting passage 26 and open between lands $b$ and $c$ and a pair of cross passages 30 and 32 intersecting passage 26 and open at land $d$. A compression spring 34 is compressed between the left end of bore 24 and the land $a$ of the valve spool 22. The spring is circumjacent a stop member 36 which has a slot 38. The recessed central portion 38 permits fluid to pass through passage 26 when the end face of land $a$ is abutting the stop member 36. The bore 24 adjacent the spring and stop member is open to an exhaust port 40. The right end of bore 24 is communicated with the reverse signal passage 42 which admits pressure to the valve bore 24 to act on the end of land $e$ to move the valve spool 22 against the spring 34 until it abuts the stop 36 whenever a reverse signal is present in passage 42.

The bore 24 is connected with the main passage 16 between lands $a$ and $b$. Thus main pressure from pump 10 is admitted to the forward-reverse valve 18. The bore 24 in the valve position shown is also in communication with a forward servo feed passage 44 between lands $a$ and $b$, a reverse servo feed passage 46 adjacent land $a$, a right forward servo control passage 48 between lands $d$ and $e$, a control motor passage 50 between lands $d$ and $e$, a left turn servo control passage 52 between lands $c$ and $d$, a control motor passage 54 between lands $c$ and $d$, a reverse right turn servo control passage 56 between lands $b$ and $c$ and a reverse left turn servo control passage 58 adjacent land $d$. When the valve spool 22 is moved against the spring 34 by a reverse signal in passage 42, the forward servo feed passage 44 is connected to exhaust between lands $b$ and $c$ and the reverse servo feed passage 46 is connected to main pressure between lands $a$ and $b$. Also, when the valve spool 22 is shifted, the reverse right turn passage 56 is connected between lands $c$ and $d$ with passage 54 and the reverse left turn passage 58 is connected between lands $d$ and $e$ with the passage 50 while the forward left turn passage 52 is connected to exhaust through passages 30 and 32 and the right forward right turn passage 48 is blocked by land $e$.

The forward servo feed passage 44 is in fluid communication with a forward servo 60 and the reverse servo feed passage 46 in fluid communication with a reverse servo 62. The servo mechanisms 60 and 62 are of the rotary type such as that shown and described in U.S. Ser. No. 715,213 filed Mar. 22, 1968, now U.S. Pat. No. 3,495,405. The forward servo 60 has an inner valve spool 64 and an outer valve sleeve 66. The reverse servo 62 also has an inner valve spool 68 and an outer valve sleeve 70. The inner valve spools 64 and 68 are connected by linkages represented by dashed lines 73, 75 to a steer control lever 72. The outer valve sleeves 66 and 70 are connected by linkages shown as dashed lines 77, 79 to a swash plate 74 of a hydraulic pump designated 76. The right forward turn passage 48 and the left forward turn passage 52 are also connected to the forward servo 60 while the reverse right turn passage 56 and the reverse left turn passage 58 are connected to the servo 62.

The control motor passage 50 is connected to a displacement control motor 78 of the pump 76 while the control motor passage 54 is connected to a displacement control motor 80 of the pump 76. The displacement control motors 78 and 80 operate to pivot the swash plate 74 to vary the displacement of the pump 76. The pump 76 is in fluid communication through passages 82 and 84 with a hydrostatic motor 86 which is a component of a transmission 88. The motor 86 is a conventional swash plate type axial piston motor, many various designs of which are commercially available. As the swash plate is moved by the displacement control motor 78 the pump 76 will deliver fluid to passage 84 to drive the hydrostatic motor 86 in the direction of arrow A. Fluid from the hydrostatic motor 86 will return to the pump 76 through the passage 82. When the displacement control motor 80 is pressurized, the swash plate 74 will move to dashed position shown so that fluid will be delivered through passage 82 to the hydrostatic motor 86 and returned to the pump 76 through the passage 84. When fluid pressure is delivered to the motor 86 through passage 82 the hydrostatic motor 86 will rotate in the direction opposite to arrow A.

The transmission 88 is a single input dual output type transmission such as that shown in U.S. Pat. No. 3,425,296. This type of transmission provides a steer bias on the output by inputting a differential speed to the output planetary gear sets of the transmission. The input shaft to the transmission is connected to drive the hydrostatic steer pump 76.

Assuming the vehicle is being driven in the forward direction, the output shafts 90 and 92 of the transmission will rotate in the direction of arrow B. If the operator desires to make a right turn, the steer lever 72 will be moved to position C thereby rotating the inner spools 64 and 68 of the forward and reverse servos 60 and 62. Rotation of the inner spool 64 will permit fluid communication between passage 44 and passage 48. The fluid pressure in passage 48 is communicated through the forward-reverse valve 18 to passage 50 and control motor 78. With the control motor 78 pressurized the swash plate of the pump 76 will move from neutral toward the position shown in full lines, and the steer motor 86 will be driven in the direction of arrow A. As the steer motor rotates in the direction of arrow A, the output planetary sets 94 and 96 of the transmission 88 will receive equal and opposite input speeds to their respective sun gears. When the sun gears of the planetary sets 94 and 96 are driven in the direction indicated, the output shaft 90 will increase in speed and the output shaft 92 will decrease in speed thus causing the vehicle to turn to the right. If a left turn is desired, the steer lever 72 will be moved to position D thereby rotating the inner spool 64 clockwise to connect passage 44 with passage 52 which is connected through the forward-reverse valve 18 to passage 54 and the control motor 80. With the control motor 80 pressurized, the swash plate 74 will move toward the dashed position thereby causing the steer motor 86 to rotate in a direction opposite to arrow A. Rotation of the steer motor 86 in this direction causes the output shaft 90 to decrease in speed and the output shaft 92 to increase in speed providing a left turn maneuver.

If the transmission is being operated in reverse, the passage 42 will be pressurized thereby shifting the valve spool 22 to the left against the spring 34 to exhaust passage 44 through passage 28 and 26 and the slot 38 in the stop 36 while connecting the passage 46 to main pressure in passage 16. If the operator desires to make a right turn in reverse, he moves the steer lever 72 to the position C thereby rotating the inner spool 68 clockwise to provide fluid communication between passage 46 and passage 56. Passage 56 will be communicated with passage 54 through the forward-reverse valve 18 between lands c and d so as to pressurize the control motor 80. With the control motor 80 pressurized, the swash plate will move toward the dashed position shown to cause rotation of the fluid motor 86 opposite to the direction of arrow A which will cause an increase in the speed of output shaft 90 and a decrease in speed of output shaft 92 which will cause the vehicle to turn to the right. If a left turn is desired, the steer lever is moved to the position D which will rotate the inner spool 68 counterclockwise to provide fluid communication through the forward-reverse valve 18 to passage 50 and the control motor 78 to cause the swash plate to move toward the full line position shown. This will drive the steer motor in the direction of arrow A to cause an increase in the speed of output shaft 92 and a decrease in the speed of output shaft 90 thereby causing the vehicle to make a left turn maneuver.

The control system shown in FIG. 2 is similar to the control system shown in FIG. 1 and includes a pump 10' drawing liquid from a reservoir 12' through an inlet passage 14' and delivering liquid through a main pressure passage 100 which is connected to a forward servo mechanism 60' and a reverse servo mechanism 62'. The servo mechanisms are identical in construction to servo mechanism 60 and 62. Also, they are connected to the manual control lever and the swash plate of the pump in a manner similar to that shown and described above for FIG. 1. The forward servo mechanism 60' is connected to a forward right turn feed passage 102 and a forward left turn feed passage 104. The reverse servo mechanism 62' is also connected with a reverse right turn feed passage 106 and a reverse left turn feed passage 108. The passages 102, 104, 106 and 108 are connected to a bore 110 of a forward-reverse valve 112. The forward-reverse valve 112 also includes a valve spool 114 having three equal diameter spaced lands a, b and c slidably disposed in the valve bore 110 and a compression spring 116 compressed between the left end of valve bore 110 and the land a. The right end of valve bore 110 is in fluid communication with a reverse passage 42'. When the reverse passage 42' is pressurized the valve spool 114 will move to the left against the spring 116. Also connected to the valve bore 114 is a pair of displacement control passages 118 and 120 which are in turn connected to control motors 78' and 80' respectively. The control motors 78' and 80' are similar to the control motors 78 and 80 shown in FIG. 1.

With the forward-reverse valve 112 in the position shown, the forward right turn passage 102 is connected to the control passage 118 and the forward left turn passage 104 is connected to the passage 120. The passages 106 and 108 of the reverse servo 62' are blocked at the forward reverse valve by lands a and b. Thus, as the servo 60' and 62' are rotated, a forward servo 60' will control the displacement of the steer pump. When a reverse signal is present in the passage 42' a valve spool 114 will be shifted to the left so that passages 102 and 104 from the servo 60' will be blocked by lands b and c, and passages 106 and 108 of the servo 62' will be communicated to the control passages 120 and 118 respectively. Thus, in the reverse position of the forward-reverse valve, the reverse servo 62' will control the pump displacement. The system functions in the same manner as the system shown in FIG. 1 with the primary difference being that main pressure is continually fed to the servos 60' and 62' while the output of the servo mechanisms 60' and 62' are selectively disconnected from control motors 78' and 80'.

Obviously, many modifications and variations will be apparent to those skilled in the art. Therefore, the above description and drawings are intended to set forth the preferred embodiments only and are not intended as limitations of the invention.

What is claimed is:

1. A steer control for a steer by driving transmission including a variable displacement steer control pump having first and second displacement control means, said steer control comprising fluid source means; manual control means movable to right and left turn positions; forward turn servo control means operatively connected with said manual control means and being in fluid communication with said source means; reverse turn servo control means operatively connected with said manual control means and being in fluid communication with said source means; and forward-reverse valve means selectively movable to a forward position and a reverse position for selectively providing fluid communication between said forward turn servo control means and the first and second displacement control means and between said reverse turn servo control means and the first and second displacement control means, whereby when said forward-reverse valve means is in the forward position and said manual control means is moved to the right turn position the first displacement control means will be pressurized, and when said manual control means is moved to the left turn position the second displacement control means will be pressurized; and when said forward-reverse valve means is in the reverse position and said manual control means is moved to said right turn position the second displacement control means will be pressurized, and when said manual control means is moved to said left turn position the first displacement control means will be pressurized.

2. A steer control for a steer by driving transmission including a variable displacement pump having displacement control means, said steer control comprising fluid source means; manual control means movable to first and second control positions; forward servo control means operatively connected with said manual control means and the displacement control means and being in fluid communication with said fluid source means; reverse servo control means operatively connected with said manual control means and said displacement control means and being in fluid communication with said fluid source means; and control valve means movable to a first position for controlling fluid communication between said forward servo control means and the displacement control means and to a second position for controlling fluid communication between said reverse servo control means and the displacement control means.

3. A steer control for a drive by steering transmission including a variable displacement steer control pump having first and second displacement control means, said steer control comprising fluid source means; manual control means movable to right and left turn positions; forward turn servo control means operatively connected with said manual control means; reverse turn servo control means operatively connected with said manual control means; and forward-reverse valve means selectively movable to a forward position and a reverse position for selectively providing fluid communication between said fluid source means, said forward turn servo control means and the first and second displacement control means and between said fluid source means, said reverse turn servo control means and the first and second displacement control means, whereby when said forward-reverse valve means is in the forward position and said manual control means is moved to the right turn position the first displacement control means will be pressurized, and when said manual control means is moved to the left turn position the second displacement control means will be pressurized; and when said forward-reverse valve means is in the reverse position and said manual control means is moved to said right turn position the second displacement control means will be pressurized, and when said manual control means is moved to said left turn position the first displacement control means will be pressurized.

4. A steer control for a steer by driving transmission including infinitely variable speed means, said steer control comprising fluid source means; manual control means movable to first and second control positions; forward servo control means operatively connected with said manual control means and the infinitely variable speed means and being in fluid communication with said fluid source means for controlling the speed setting of the infinitely variable speed means in forward drive; reverse servo control means operatively connected with said manual control means and the infinitely variable speed means and being in fluid communication with said fluid source means for controlling the infinitely variable speed means in reverse drives; and control valve means movable to a first position for controlling fluid communication between said forward servo control means and the infinitely variable speed means and to a second position for controlling fluid communication between said reverse servo control means and the infinitely variable speed means.

* * * * *